United States Patent
White et al.

(10) Patent No.: US 11,055,452 B2
(45) Date of Patent: Jul. 6, 2021

(54) TRANSFORMING OBJECT MODEL DATA

(71) Applicant: Hewlett-Packard Development Company, L.P., Houston, TX (US)

(72) Inventors: Scott White, Boise, ID (US); Helen Balinsky, Bristol (GB); Tanguy Delume, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 626 days.

(21) Appl. No.: 15/837,919

(22) Filed: Dec. 11, 2017

(65) Prior Publication Data

US 2018/0173826 A1 Jun. 21, 2018

(30) Foreign Application Priority Data

Dec. 20, 2016 (EP) .................................... 16306745

(51) Int. Cl.
| | |
|---|---|
| *G06F 30/20* | (2020.01) |
| *G06F 30/00* | (2020.01) |
| *B33Y 50/02* | (2015.01) |
| *H04L 9/00* | (2006.01) |

(52) U.S. Cl.
CPC .............. *G06F 30/20* (2020.01); *G06F 30/00* (2020.01); *B33Y 50/02* (2014.12); *H04L 9/00* (2013.01)

(58) Field of Classification Search
CPC ......... G06F 30/20; G06F 30/00; B33Y 50/02; H04L 9/00
See application file for complete search history.

(56) References Cited

U.S. PATENT DOCUMENTS

| | | | |
|---|---|---|---|
| 9,218,692 B2 | 12/2015 | Miller et al. | |
| 9,374,223 B2* | 6/2016 | Kubota | ............... G06F 21/6227 |
| 10,311,169 B1* | 6/2019 | Leedom | .................. G06F 30/00 |
| 2005/0210444 A1 | 9/2005 | Gibson | |
| 2009/0046856 A1 | 2/2009 | Mitchell | |
| 2013/0305380 A1* | 11/2013 | Diehl | ...................... G06F 21/60 |
| | | | 726/26 |
| 2014/0156053 A1 | 6/2014 | Mahdavi et al. | |
| 2015/0224715 A1* | 8/2015 | Badhani | ................ B29C 64/386 |
| | | | 700/98 |
| 2015/0254374 A1* | 9/2015 | Kozhukhin | ............ B22D 46/00 |
| | | | 700/99 |
| 2015/0350278 A1 | 12/2015 | Isbjornssund | |

(Continued)

OTHER PUBLICATIONS

Kim et al. "Multi-Level modeling and access control for data sharing in collaborative design". Advanced Engineering Informatics 20 (2006) 47-57. (Year: 2006).*

(Continued)

*Primary Examiner* — Eunhee Kim
(74) *Attorney, Agent, or Firm* — Fabian VanCott

(57) ABSTRACT

In an example, a method includes acquiring, at a processor, first object model data representing a first three-dimensional object. A portion of the first object model data representing an object region to be concealed may be identified using the processor. The first object model data may be transformed, using the processor, to determine second object model data representing a modified first three-dimensional object which is distended in the object region represented by the identified portion of the first object model data.

19 Claims, 5 Drawing Sheets

(56) References Cited

U.S. PATENT DOCUMENTS

2016/0162603 A1* 6/2016 Schriesheim ........... G06F 30/00
 703/1
2016/0229120 A1 8/2016 Levine

OTHER PUBLICATIONS

Intellectual Property Protection in Additive Layer Manufacturing, Yampolskiy et al. ACM. Dec. 2014.
It's Time for 3D Printing File Security to "Grow Secure", Jun. 11, 2015, https://3dprintingindustry.com/news/time-additive-manufacturing-file-security-grow-secure-50674/.
Modeling and evaluating information leakage caused by inferences in supply chains, Zhang et al. 2010 Elsevier. 13 Pages.
Multi-level modeling and access control for data sharing in collaborative design, Kim et al. Advanced Engineering informtics 20 (2006) 47-57.

* cited by examiner

TRANSFORMING OBJECT MODEL DATA

BACKGROUND

Three-dimensional objects generated by an additive manufacturing process may be formed in a layer-by-layer manner. In one example of additive manufacturing, an object is generated by solidifying portions of layers of build material. In other examples, three-dimensional objects may be generated using extruded plastics or sprayed materials as build materials, which solidify to form an object.

Additive manufacturing systems may generate objects based on design data. This may involve a designer generating a three-dimensional model of an object to be generated, for example using a computer aided design (CAD) application. Some object generation processes that generate three-dimensional objects use control data generated from such a model of a three-dimensional object. This control data may, for example, specify the locations at which to apply an agent to the build material, or where a build material itself may be placed, and the amounts to be placed.

BRIEF DESCRIPTION OF DRAWINGS

Non-limiting examples will now be described with reference to the accompanying drawings, in which.

DETAILED DESCRIPTION

Figure 1:
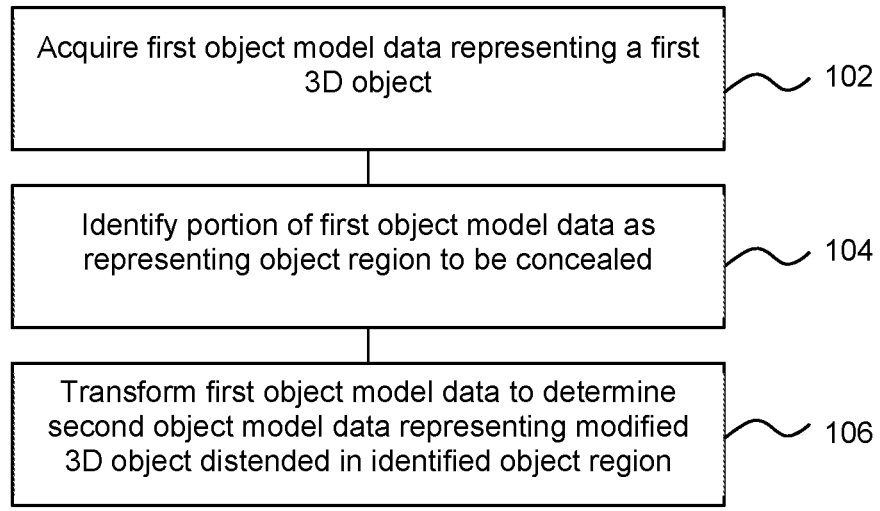
FIG. 1 is a flowchart of an example method of transforming object model data to conceal a portion thereof.

Some additive manufacturing systems employ digital models of an object to be generated. For example, a model may define the solid portions of the object, and may in some examples associate intended properties and/or materials with all or portions of the object.

Such a model may be generated using considerable skill and labour and thus has a value to the designer or another owner of the data. As such, it may be intended to protect the data, for example by encryption and the like. A model may for example represent a new and/or experimental prototype of a future product, and maintaining confidentiality may protect a competitive edge of the product owner. In another example, a model could contain private (e.g. personal, or patient) data, such that confidentiality should be maintained. In a further example, a model could be a high value part which is to be protected under rights management for manufacturing. However, in order to manufacture an object to the design data, the data may be exposed to various parties. For example, a design data owner may offer the design for purchase, or may wish to request a cost estimate or manufacturing schedule for generating an object. In this way, design data may be exposed to at least one party. In some examples, this data exposure may take place before any contractual relationship is established.

Additive manufacturing techniques may generate a three-dimensional object through the solidification of a build material. This may be carried out in a layer-by-layer manner and, in some such examples, a digital model can be processed to generate slices of parallel planes of the model. Each slice may define a portion of a respective layer of build material that is to be solidified or caused to coalesce by the additive manufacturing system. The properties of generated objects may depend on the type of build material and the type of solidification mechanism used. Build material may be deposited, for example on a print bed and processed layer by layer, for example within a fabrication chamber.

In some examples, the build material may be a powder-like granular material, which may for example be a plastic, ceramic or metal powder. Selective solidification may be achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated. The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In some examples herein, three-dimensional space is characterised in terms of 'voxels' (by analogy to two-dimensional 'pixels'), wherein each voxel occupies a discrete volume. In data modelling a three-dimensional object, a voxel at a given location may have at least one attribute. For example, it may be empty, or may be associated with a particular material and/or object property which that voxel is intended to have in the generated article. Object properties may comprise for example appearance properties (color, transparency, glossiness, etc.), conductivity, density, porosity and/or mechanical properties such as strength, and different object portions may comprise different object properties.

The voxels representing an object may have the same shape (for example, cubic or tetrahedral), or may differ in shape and/or size. A voxel may correspond to a region of a three-dimensional object which is an individually addressable area in additive manufacturing, or may be defined in some other way. In some examples in which the intended solidification and/or physical properties may be achieved by printing an agent onto a layer of the build material to form a slice of an object, a voxel may represent a volume defined by the thickness of a layer of build material and the surface area of a layer which can be individually addressed with an agent. In some contexts, a voxel may be the resolution to which an object model, an object, or object generation data, is defined.

As mentioned above, in an additive manufacturing/object generation workflow, there may be various entities which call for some knowledge of the object to be generated. However, while the entities may be trusted to perform their assigned workflow task, in some examples (or as a matter of data security good practise), the entities and/or data communication security may not be fully trusted. This may be, for example, as data security is not assured, for example during data transfer or at the entity site. In other examples, there may be a concern that design data may be maliciously accessed, modified, retained and/or passed on.

However, it may be the case that certain tasks in an additive manufacturing workflow may be accomplished through provision of data in which at least one part of the object is concealed or obfuscated. By deriving and transmitting or providing access to such data the workflow may proceed while distribution of the object model data in its original form is controlled, in some examples being minimised or reduced.

FIG. 1 is an example of a method, which may be implemented using at least one processor. In some examples, the method may be implemented in a secure data processing environment. In some examples, the method may be carried out in an environment controlled by, or trusted by, a designer or design owner. In some examples, the method may be a method of concealing part of object model data, which may be a selected part.

Block 102 comprises acquiring first object model data representing a first three-dimensional object. The object may be an object to be generated in additive manufacturing. The data may for example comprise a voxel representation of an object, or a 'wireframe', mesh or vector representation of the object. In some examples, the data may comprise a representation of the object's surface. The data may for example be stored using a 3MF format, Stereolithography (STL) file format, OBJ file format, or any other file format capable of representing a three dimensional object.

In some examples, the first object model data may be suitable to provide an input into an additive manufacturing workflow, and may comprise all the design data necessary for object generation. In some examples, the first object model data may be suitable to allow an object to be generated at least substantially automatically. In other words, although processing of the data may be carried out in order to develop control data for generating the object, it may be the case that such processing will not comprise developing design data or substantial user/designer input. In some examples, the first object model data may be or comprise control data to control an additive manufacturing apparatus to generate the object, for example comprising control data for an additive manufacturing apparatus. In other examples, the object model data may be processed, for example using mapping tables, to determine what materials are to be used in generating the object, and processing (for example, halftoning) to determine where the materials should be placed, and the like.

In some examples, the object model data may comprise or be associated with object property data. For example, the object model data may define a three-dimensional model of at least a portion of the object, for example defining the shape and extent (e.g. the solid portions of the object) and/or surface of all or part of an object in a three-dimensional co-ordinate system. The object model data may for example be data generated by a computer aided design (CAD) application or the like. Object property data may for example define at least one object property for the three-dimensional object to be generated. For example, object property data may comprise a color, flexibility, elasticity, rigidity, surface roughness, porosity, inter-layer strength, density, conductivity and the like for at least a portion of the object to be generated. In some examples, rather than being described in terms of property values, the object property data may be described in terms of materials, for example, build materials and/or print agents to be used in generating the object. Such object property data may be defined, for example, for the whole of an object to be generated (global property data) or for one or multiple portions of an object to be generated (local property data). Object property data may define multiple object properties for a portion or portions of an object.

Such object model data may be received as a single file or as multiple data objects. In some examples, the object model data may be provided in terms of voxels that are defined in a three-dimensional (also referred to herein as [x,y,z]) space. A given voxel may have an attribute. For example, a voxel may be associated with data that indicates whether a portion of the model object is present at that location. In some examples, object property values (for example as defined in object property data) may be associated with each voxel as an attribute thereof. Object property data may thereby be associated with a set of voxels, e.g. ranging from individual voxels to all voxels associated with the object.

For example, object model data may describe a number of voxels, each of which has an intended relative location in space. The voxels may populate the solid regions of the object. In relation to at least one of those voxels, at least one property value may be specified: for example, a particular voxel may be red (or a particular red) and transparent, while another voxel may be blue and have a particular density. In one example, the object model data comprises a model of a three-dimensional object that has at least one object property specified at every location within the model, e.g. at every [x, y, z] co-ordinate.

Block 104 comprises identifying at least one portion of the first object model data as representing an object region to be concealed. The region(s) may for example comprise surfaces or structures which extend over part of the object, but not the whole object (i.e. sub-portions/sub-regions). The region(s) may for example comprise a comparatively sensitive region, i.e. a region of the object which, if exposed or improperly accessed by unauthorised or unintended parties, would be comparatively detrimental when compared to other object regions. For example, if the object was a cup with a novel design feature which was provided by the shape of a handle, the handle may be identified as an object region to be concealed whereas the body of the cup may not be so identified. However, in some examples, 'non-sensitive' regions may be selected in order to conceal what region is considered sensitive. In some examples, the object region is identified following user input. For example, a user may indicate a region by enclosing the corresponding portion of a graphical representation of the region in a loop using a graphic interface. In another example, a user may indicate a point on a surface, and the processor may identify the extent of that surface based on its geometry. In another example, an object portion within a distance (for example, a radius, which in some examples may be user defined) of a user-indicated point may comprise the identified region. The surface may be an internal or external surface. In another example, at least one object portion may be labelled, or otherwise identified, and a user may select a label or the like. In another example, a user may indicate a plurality of points (e.g. three points) forming at least one surface such as a plane, and the intersection of the surface(s) and the object may define the region. In a further example, the portion may be identified automatically, for example as having a texture, geometry or the like which matches predetermined characteristics, or which differs from another object (for example, a previously released version of the object, such that new features of, say, a cellular telephone or some other object, could be automatically identified by comparing the object model data to a previous version of that cellular telephone/ other object). For example, an object surface may be identified using range segmentation, which may be region-based or edge-based.

Block 106 comprises transforming the first object model data to determine second object model data representing a modified first three-dimensional object which is distended in the identified object region. The modified first three-dimensional object may be substantially the same as the original first three-dimensional object in other object regions (i.e. it may be substantially the same as the first three-dimensional object outside the identified object region(s)). The transformation may be applied to the data portion(s) representing the identified object region(s) to be concealed (and, in some examples, not to other data portions). The object region is distended meaning that the original object region may be wholly contained within the distended region, i.e. the surface of the distended region at least encloses the surface of the region prior to it being distended. The modified object may therefore be larger than the original object at at least one point. To consider it another way, the transformation may comprise extending data representing the identified object region to enclose a volume external to the first three dimensional object. It may be that, at at least one point, the surface of the distended portion is in the same location as the corresponding surface of the original object. However, at at least one point, the surface of the distended portion encloses an additional volume beyond the corresponding surface of the original object. By distending the first object in a region thereof (rather than, for example, simply changes which could result in an object portion being recessed below the original surface), the modified object occupies all of the space of the original object, as well as some additional space.

This means that the original shape, contours and features of the region of the object which are distended are concealed or obfuscated. In the case where these features are particularly sensitive or valuable, the sensitivity of the second object model data characterising the modified first object is therefore reduced when compared to the first object model data characterising the first object and it may be the case that the second object model data may be distributed with less concern that a would-be imitator or any other person who may wish to gain access to the design could derive the full design, and therefore the full benefit of the object model data.

In some examples, the second object model data may be to be distributed as part as an object generation workflow, for example being supplied to allow 'batching' of a number of objects to be generated at once. In batching processes, a number of the same or different objects may be considered for fabricating in a single build operation, and the batching process may comprise arranging the objects. In order to increase production rates, it may be that the objects are to be packed within a fabrication chamber as closely as is practical. As such, it may be determined if an object may be rotated for better packing, or if it provides a void in which another object may be manufactured, or if it may be manufactured alongside, or in a void of, another object or objects, or the like. As such, in 'batching', voids or channels in one object may be used to generate at least part of another object.

In this example, as at least one portion is distended, the underlying design features of the original object are obscured (and may be entirely absent in the second object model data) and therefore protected from copying. While this is at the cost of the object which is used to determine batching being larger than the object to be manufactured (and therefore possibly reducing the packing efficiency and/or increasing the volume reserved for generating the object, and in turn, in some examples, the associated price for object generation), this is mitigated by the fact that just identified portions are distended. In addition, a build operation for generating the object may be costed lower if the distortion is applied just to region(s) of interest (for example, regions relating to particularly sensitive, valuable or innovative design features) as the volume of a build chamber to be reserved for manufacturing the object may be lower than if the object as a whole was enlarged to conceal the features. This could be compared to, for example, replacing the object as whole with its bounding box, in which case all opportunities for nesting within the object space would be lost, which may increase costs and/or reduce manufacturing throughput more than the currently proposed method.

Moreover, as just identified region(s) are distended, the data processing carried out in determining the second object model data is relatively low when compared to some examples in which each region of the object is obfuscated. As the object is distended, this means batching operations will not place another object in a region which the first object will occupy in object generation (as could be the case if, instead an object region was allowed to shrink within the original boundary). Thus, by concealing the object portion specifically by distending it (when compared, for example, to more generally blurring or distorting it), the object generation pipeline may continue as intended.

Either or both of the first and second object model data may be stored and may be digitally secured, for example with encryption, signatures or the like, before distribution.

The manner in which the object region is distended may comprise any, or any combination of techniques such as those set out below, all of which result in effect in the modified object which would, if generated, comprise additional material compared to the original object. In the below examples, it may be the case that, where the surface of the distended object does not coincide with a corresponding surface of the original object, the object model data relating to the surface of the original object provided in the first object model data is absent in the second object model data.

Figure 2A:
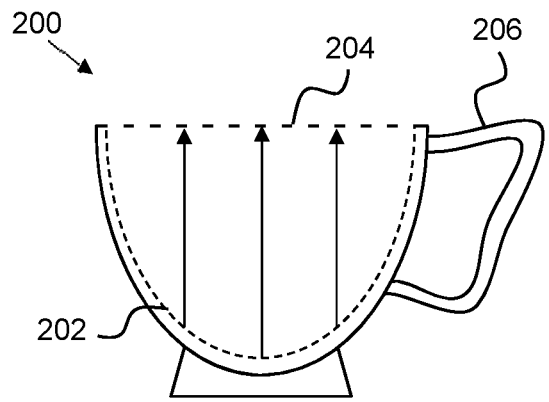
FIG. 2A-E represent different example transformations which may be applied to object model data.

In one example, as shown in FIG. 2A, data representing a concavity in the identified object region is transformed to at least partially reduce the depth of the concavity. This may comprise, for example, in effect filling a concavity with material, either by mapping a surface to another surface in which the concavity is shallower, or as in the example of the figure, non-existent, or by 'adding' material directly, for example adding voxels into the concavity. FIG. 2A shows a cup 200 having a liquid containing cavity. In generating the modified version of the cup, the portion of cup 200 comprising the cavity is replaced such that an original concave inner surface 202 is replaced with a distended surface 204, spanning the mouth of the concavity. The relationship between the original and the distended surface is shown using arrows.

Figure 2B:
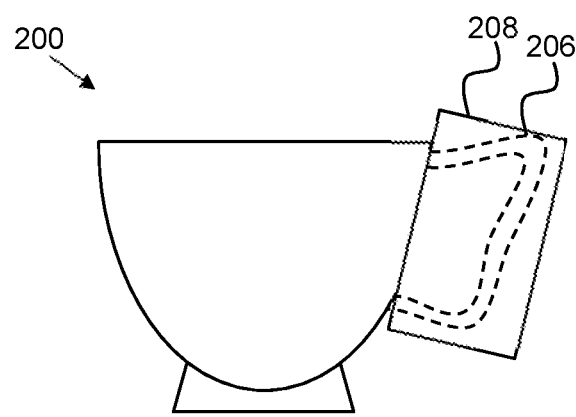
Figure 2C:
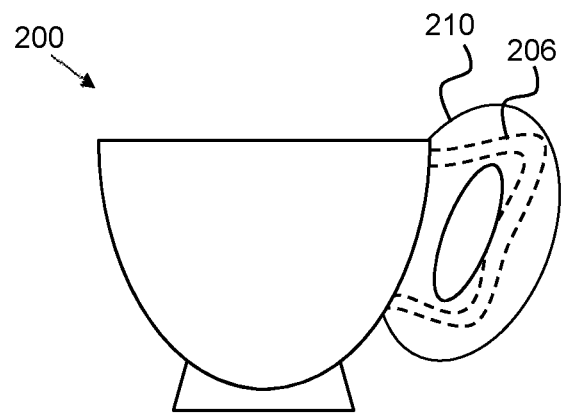

In another example, data representing the identified object region may be replaced with data representing a predetermined geometrical shape bounding the region. Such shapes may be filled shapes, for example solid cubes, cuboids, prisms, spheroids or the like. For example, in the above described case of a cup 200, and as shown in FIG. 2B, an identified data portion of the handle 206 may be replaced with a cuboid 208 fully enclosing the handle and the void between the handle and the cup body (in some examples, the smallest cuboid which fully encloses the handle). Instead of a single cuboid (or other shapes), a plurality of shapes could be used to fill the area. In another example, as shown in FIG.

2C, the shape of the handle 206 may be obscured by replacing it with at least one shape 210 (in this example, a cylinder) which follow the form thereof (i.e. data indicating the presence of the void may be retained). In some examples the shapes 210 may be user selected or determined automatically. Such shapes could include shapes having quadratic surfaces such as cones, cylinders, ellipsoids, spheroids, spheres, hyperboloids, paraboloids and the like. The choice of which shapes to use may be automated, for example to select the closest surface (which in turn may limit the degree of distension while concealing identified feature(s) (for example, sensitive feature(s)) of the original design. In another example, one or more shapes could be added to a surface or to enclose at least part of a selected portion, for example being placed or positioned based on user input or automatically. The size and form of such shapes may be user selected in some examples, or may be selected automatically.

Figure 2D:
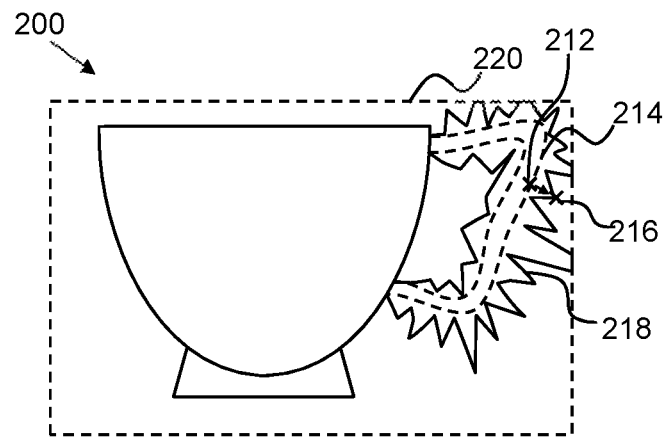

In another example illustrated in FIG. 2D, transforming the first object model data may comprise applying a random or pseudorandom function to at least one data point characterising an object surface of the identified object region. For example, this may comprise using a function to map a point 212 (for example, a vertex in a mesh representation) in a surface 214 of the object to a selected point 216 on a surface 218 which was previously external to the object. In some examples, each mapped point may be mapped according to a noise function or a random or pseudorandom function.

In some examples, transforming the first object model data comprises determining the second object model data to represent a modified first three-dimensional object wherein the distension of the first three-dimensional object is applied such that the distended surface is within a bounding box 220 bounding the first three-dimensional object. A 'bounding box', as shown in FIG. 2D is a cuboid which fully encloses the object and in some examples a region outside the object. Such bounding boxes may be used in three dimensional object modelling as a relatively crude representation of the volume the object may occupy. There may be little benefit to extending the object beyond the boundary box, and therefore setting a condition that the distension remains within the bounding box 220 may in turn reduce the opportunity for needlessly distending the object. Although shown in relation to the distension of FIG. 2D, this could be used for any of the distension techniques. In some examples however, an object may be distended beyond the bounding box 220, e.g. to conceal the full geometry, accurate sizes of object or its nature. In FIG. 2D, the condition that the distension is contained within the bounding box 220 is shown in the truncation of some of the transformations applied to data points, i.e. the surface 218 is wholly contained within the bounding box 220. In other examples, boundaries other than the bounding boxes may be defined, for example by a user.

There may be other conditions on the distortion applied. For example, a distension may be determined to resolve any clashes between surfaces which are distended towards one another. In a mesh-based surface representations both positions of vertices and mesh topology may be modified to make it computationally hard to restore an original object from a modified object. In a voxel-based object, there may be a condition that each location corresponds to at most a single voxel.

Figure 2E:
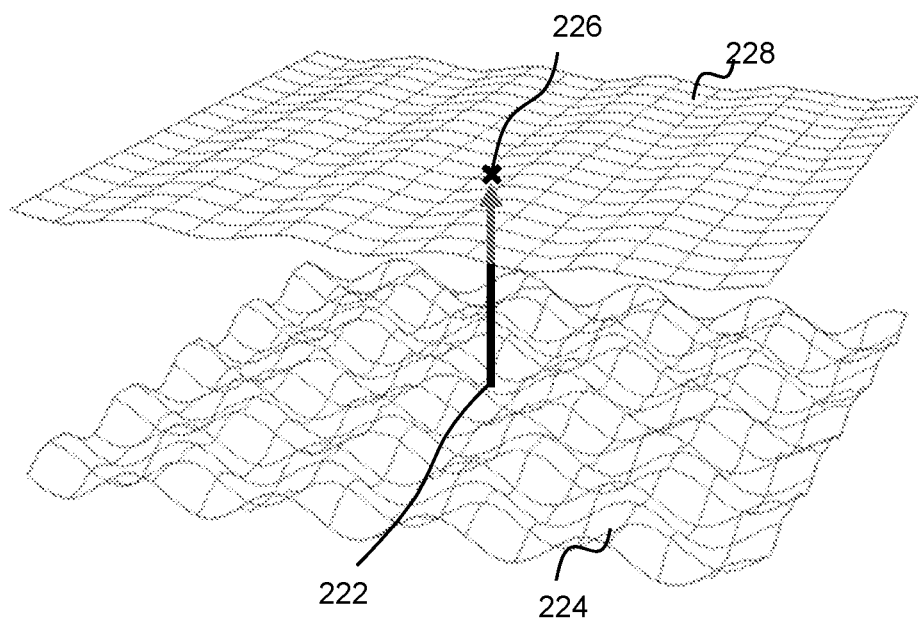

In another example, as shown in FIG. 2E, transforming the first object model data may comprise replacing at least one data point 222 characterising an object surface 224 of the identified object region with a data point 226 in a predetermined regular surface 228. As used herein, a regular surface is a surface with a smoothly varying function, which can be described using a mathematical function. The new regular surface 228 is exterior to the original object surface 224 at at least one, and in some examples, most or all points, and the distended portion can therefore fully encapsulate the original surface of the portion. In some cases, the smooth surface may be derived based on the original surface, for example being fitted to a predetermined number of the 'highest' points of the surface (in some cases with an offset therefrom), or any underlying curve of the object surface 224. For example, the surface may be a quadratic surface, such as a cone, cylinder, ellipsoid, spheroid, sphere, hyperboloid, paraboloid, or the like. Higher degree surfaces could be used in some examples.

Figure 3:
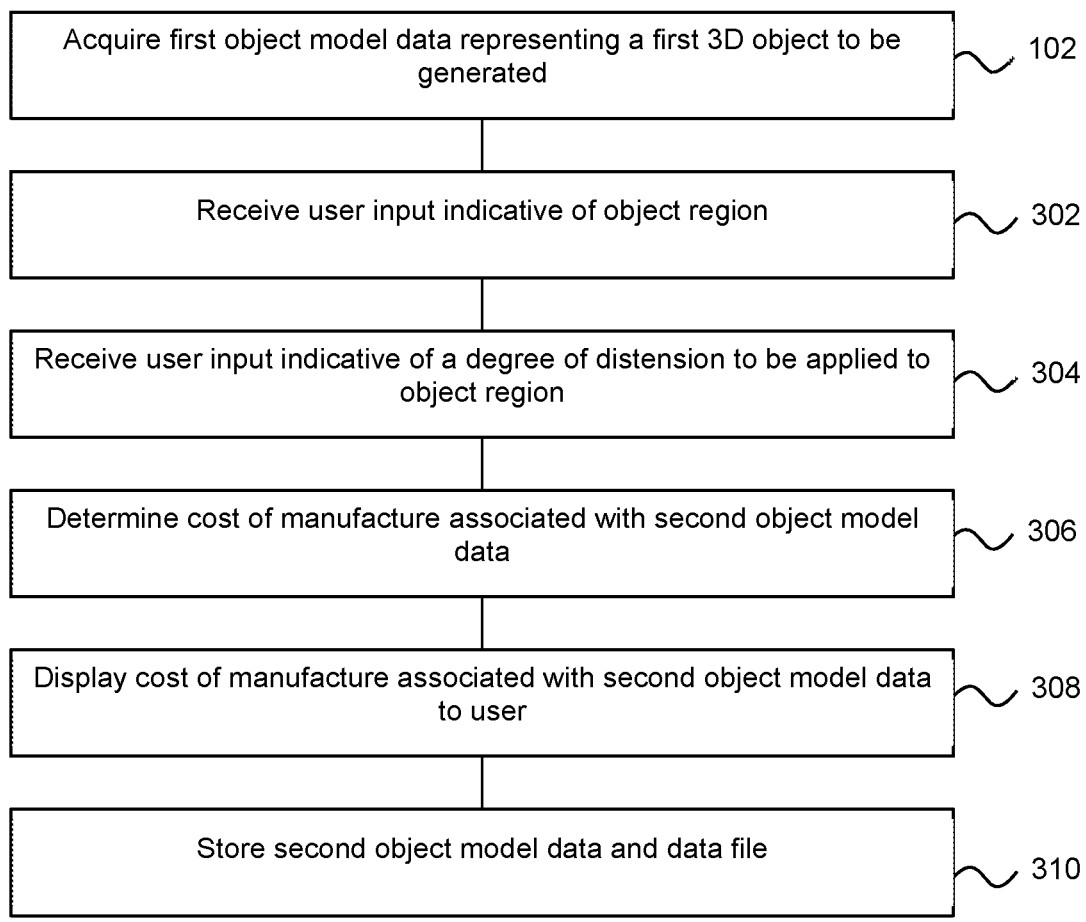
FIG. 3 is a flowchart of an example method of determining and storing object model data.

FIG. 3 is another example of a method, which may be used in an object generation workflow. Block 102 is as described in relation to FIG. 1 above. Block 302 comprises receiving a user input indicative of the object region. This is used to identify a portion of the first object model data representing an object region to be concealed as described in relation to block 104 above.

Block 304 comprises receiving a user input indicative of a degree of distension to be applied to the object region. For example, this may specify a minimum thickness of 'padding' to be applied to each point on the surface, may set a variable for a level of noise, and/or may set a threshold similarity constraint (such that the original and distended portions are different by at least a predetermined amount).

In some examples, block 302 and/or block 304 may comprise interacting with an image of the object presented on a screen, for example indicating points or regions, expanding and contracting the object changing variables and/or receiving a visual feedback of the result.

In block 306, an indication of a cost of manufacture associated with the second object model data is determined and, in block 308, displayed to a user.

As discussed above, by distending the object, the estimated cost to manufacture may increase. This is the case even though the object will be manufactured to the original specification as, in effect, an additional portion of the fabrication chamber is reserved for the sake of increasing the design security, and opportunities for close packing, nesting and the like within the fabrication chamber may be lost. The price may increase as the degree of distension increases and in some examples blocks 304 to 308 may be carried out in a number of cycles until the user is satisfied with the balance between the level of concealment provided to the design and the cost of manufacture. In some examples, the type(s) of distortion (e.g. add noise, encapsulate object region with geometric shape, fill concavities, add shapes and the like) to be applied may also be selected by a user. For example, each applied distension could be reviewed by a user, who may opt to increase or decrease the amount of additional material to be added, or to change the type of distension applied, to create a modified object. For example, a 'slider' graphical interface may be provided. The control to add or remove material may be control at the level of voxels. In other examples, this could be performed automatically, by evaluating a degree of similarity between the modified object and the original object in at least the region to be concealed, and iterating until a threshold level is reached. In another example, different distensions may be applied on the basis that they are associated with a predetermined (for example, user specified) cost or cost increase, and evaluated. These may for example be ranked and/or the optimal distension in terms of concealment associated with a particular cost or cost band may be identified, in some examples automatically by evaluating a degree of similarity between the original and modified object.

Block 310 comprises storing the second object model data and a data file. In one example, the data file comprises an indication of any object portion contained within the modified first three-dimensional object, and not within the first three-dimensional object prior to transformation. In one example, such an object portion may have an indication of the distended surface and of the original surface. In another example, a transformation function to transform the modified first three-dimensional object into the first three-dimensional object may be stored as a data file. Such data files may each be used to recover the first object model data, effectively reversing the distension applied, for example by subtracting any object portion contained within the modified first three-dimensional object, and not within the first three-dimensional object prior to transformation or applying the transformation function. In other examples, both the first and second object model data may be retained in their entirety. However, it may be the case that the data file containing information to recover the first object model data occupies less memory than the first object model data in its entirety. Such a data file may itself be protected, for example using encryption and the like, before being distributed.

In one example workflow, therefore, the second object model data may be used in 'batching' and forwarded to an object fabricator. The object fabricator may also receive an encrypted data file, either from the batching entity or elsewhere, decrypt this and use the data therein to derive the first object model data, from which the object may be generated. In some examples, decryption of the first data model by any work flow participant other than the fabricated may be prevented.

As mentioned above, in another example, both the first and second object model data may be retained. These may be stored together or separately. However, in some such examples, the first object model data may be encrypted while the second object model data is not, or the first object model data may be encrypted with a higher security that the second object model data, and/or the object model data may be encrypted with a different key to the key used to encrypt the second object model data.

Figure 4:
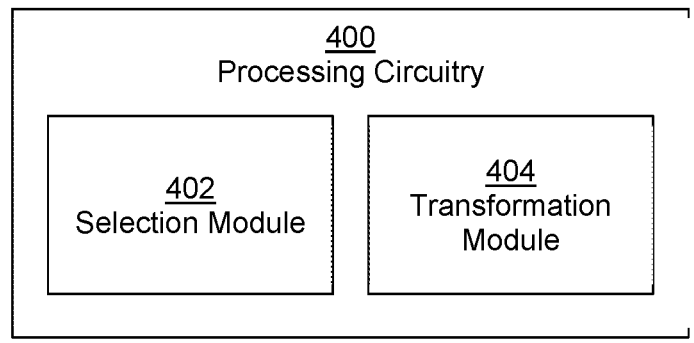
FIG. 4 is a representation of an example processing circuitry.

FIG. 4 is an example of processing circuitry 400 comprising a selection module 402 and a transformation module 404. The selection module 402 is operable to select a portion of an object represented in object model data as an object portion which to be concealed. The transformation module 404 is operable to transform the object model data to distend the object in a selected object portion to provide object model data representing a modified object. In some examples, the information relating to at least part of the selected portion may be entirely replaced in the object model data representing a modified object.

In some examples, the transformation module 404 is operable to transform data representing a surface of the selected object portion by mapping a plurality of data points representing the surface to displace them from their original position (with the condition that the displaced position is external to the original object). For example, the data points may be vertices in a mesh or wire frame representation of the surface. In some examples, the data points may be mapped to a surface to which the selected object portion is interior and which further encloses a region which external to the selected object portion. In another example, each of the plurality of data points may be mapped to a new data point determined according to a function, which may be a random or pseudorandom function, for example a noise function. In some examples it could be uniformly distributed random or pseudo-random function.

In another example, the transformation module 404 may be operable to transform data representing the selected object portion by adding at least one predetermined volume to the exterior of the selected object portion. This could for example comprise adding at least one voxel, or some other volume, to the exterior.

Figure 5:
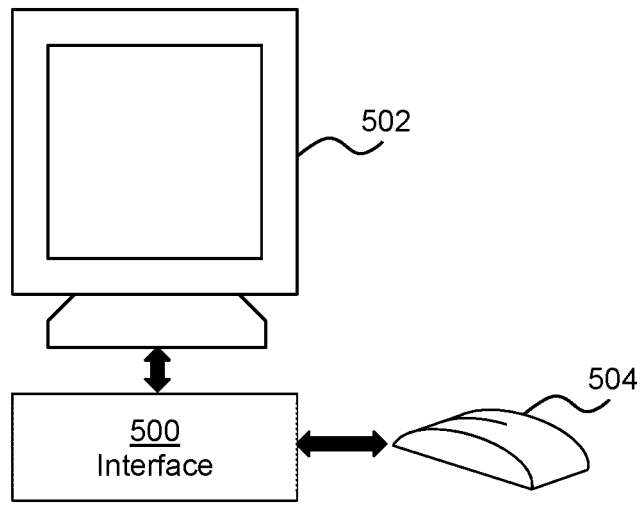
FIG. 5 is a representation of an interface in association with a display device and user input device.

FIG. 5 shows an interface 500 which controls a display device 502 and which receives input from a user input device 504, which in this example is a computer 'mouse'.

The interface 500 is operable to control the display device 502 to display the object and the modified object, for example simultaneously or consecutively or in some other manner. Such a display may allow the user to verify that the portion of the object to be concealed is sufficiently obscured. The display device 502 may also display build cost information.

The apparatus of FIG. 5 may operate in conjunction with the processing circuitry 400 of FIG. 4. The processing circuitry 400 may be configured so as to carry out any of the blocks of FIG. 1 or FIG. 3, or the actions described in relation thereto.

The input device 504 in this example allows user inputs, which comprise at least one of (i) a user selection of a portion of the object that is sensitive (i.e. to provide information to the selection module 402); (ii) a user selection of a type of distension to be applied to a selected object portion; and/or (iii) a user selection of a degree of distension to be applied to a selected object portion.

Figure 6:
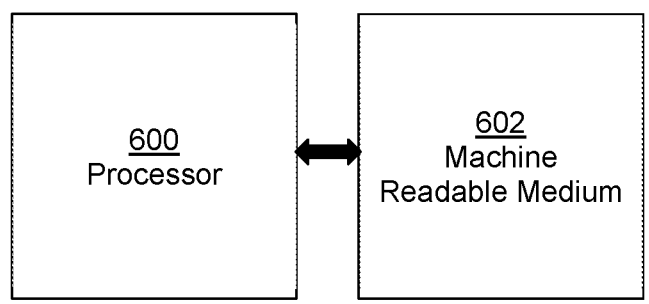
FIG. 6 is a representation of an example of a processor in association with a machine readable medium.

FIG. 6 shows a processor 600 in communication with a machine readable medium 602. The machine readable medium 602 comprises instructions which, when executed by the processor 600, cause the processor 600 to, on receipt of at least one user input identifying a sub-region of a three-dimensional object which is to be concealed, transform data representing the three dimensional object so as to represent an object which is distended in the user identified sub-region. The user identified sub-region may for example comprise a sub-region which the user wishes to conceal in at least part of an additive manufacturing process, although it may include at least one other region (for example, to cast doubt on which feature is determined by the user to be confidential).

In some examples, the machine readable medium 602 comprises further instructions which, when executed by the processor 600, cause the processor 600 to, on receipt of at least one user input identifying a degree to which the sub-region of the three-dimensional object is to be distended, determine a transformation to apply to the data.

The machine readable medium 602 comprises further instructions which, when executed by the processor 600, cause the processor 600 to carry out any of the blocks of FIG. 1 or FIG. 3, or the actions described in relation thereto.

Examples in the present disclosure can be provided as methods, systems or machine readable instructions, such as any combination of software, hardware, firmware or the like. Such machine readable instructions may be included on a machine readable storage medium (including but is not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some flows and blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus and devices (for example, the selection module 402, the transformation module 404 and the interface 500) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g. a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
acquiring, at a processor, first object model data representing a first three-dimensional object;
identifying, using the processor, a feature on an exterior of the first three-dimensional object that is considered to be sensitive and is to be concealed; and
transforming, using the processor, the first object model data to generate second object model data representing a modified first three-dimensional object in which the sensitive feature on the exterior of the object is covered by and hidden within a block of material that encompasses all voxels included in the sensitive feature such that a surface of the block of material in the second object model data is distended beyond an original surface of the object as represented by the first object model data so as to hide the sensitive feature within the block of material.

2. A method according to claim 1 in which identifying the sensitive feature a comprises receiving user input that indicates the sensitive feature.

3. A method according to claim 1 further comprising, in addition to the block of material over the sensitive feature, modifying the second object model data to comprise additional blocks of material at different portions of the exterior of the object so that the block of material over the sensitive feature is one of multiple blocks of material added to the exterior of the object so as to obscure to an observer where on the object the sensitive feature is located.

4. A method according to claim 3, further comprising resolving any clashes between surfaces which are distended toward one another.

5. A method according to claim 1 further comprising receiving user input that control an amount of distension to be applied to form the block of material concealing the sensitive feature.

6. A method according to claim 1 in which the block of material is sized so as to be contained within a bounding box bounding the first three-dimensional object.

7. A method according to claim 1 comprising determining an indication of a cost of manufacture associated with the second object model data and displaying the cost of manufacture to a user.

8. A method according to claim 1 comprising storing a data file, the data file comprising an indication of any object portion contained within the modified first three-dimensional object, and not within the first three-dimensional object prior to transformation.

9. A method according to claim 1 comprising determining a transformation function to transform the modified first three-dimensional object into the first three-dimensional object.

10. A method according to claim 1 wherein the block is a solid block.

11. A method according to claim 1 wherein the block has a geometrical shape.

12. A method according to claim 11, wherein the geometrical shape of the block is selected based on which geometrical shape conforms to a surface of the feature being concealed.

13. A method according to claim 1, wherein a surface of the block has a random or pseudorandom function.

14. Processing circuitry comprising:
a selection module to receiving object model data representing a three-dimensional object and identify a feature on an exterior of the three-dimensional object that is considered to be sensitive and is to be concealed; and
a transformation module to transform the object model data to generate modified object model data representing a modified three-dimensional object in which the sensitive feature on the exterior of the object is covered by and hidden within a block of material;

the transformation module further, in addition to the block of material over the sensitive feature, modifying the modified object model data to comprise additional blocks of material at different portions on the exterior of the object so that the block of material over the sensitive feature is one of multiple blocks of material added to the exterior of the object so as to hide from an observer where on the object the sensitive feature is located and obscure which portion of the object is the sensitive feature being concealed.

15. Processing circuitry according to claim 14 further comprising an interface to control a display device to display a representation of the object and of the modified object.

16. Processing circuitry according to claim 15 in which the interface is further to receive a user input, the user input comprising at least one of:
    a user selection of a portion of the object that the user wants to conceal as the sensitive feature;
    a user selection of a type of distension to be applied to the sensitive feature; and
    a user selection of a degree of distension to be applied to the sensitive feature.

17. Processing circuitry according to claim 14 in which the transformation module is to transform data representing a surface of the selected sensitive feature by mapping a plurality of data points representing the surface to
    a plurality of data points determined according to a function.

18. A non-transitory machine readable medium comprising instructions which, when executed by a processor, cause the processor to:

receive first object model data representing a first three-dimensional object;

identify a feature on an exterior of the first three-dimensional object that is considered to be sensitive and is to be concealed;

transform the first object model data to generate second object model data representing a modified first three-dimensional object in which the sensitive feature on the exterior of the object is covered by and hidden within a block of material such that, including the block of material, a surface of the block of material in the second object model data is distended beyond an original surface of the object as represented by the first object model data so as to hide the sensitive feature within the block of material; and accept user input specifying a minimum thickness of material to be added to points of the sensitive feature to form the block of material.

19. The non-transitory medium according to claim 18 further comprising instructions which, when executed by a processor, cause the processor to further transform the data representing the three-dimensional object so as to, in addition to the block of material over the sensitive feature, modifying the object model data to comprise additional blocks of material at different portions of the exterior of the object so that the block of material over the sensitive feature is one of multiple blocks of material added to the exterior of the object so as to obscure to an observer where on the object the sensitive feature is located.

* * * * *